(12) United States Patent
Simons

(10) Patent No.: US 8,589,111 B2
(45) Date of Patent: *Nov. 19, 2013

(54) REMOTE TESTING OF HVAC SYSTEMS

(71) Applicant: Honeywell International Inc., Morristown, NJ (US)

(72) Inventor: Richard Simons, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,756

(22) Filed: Nov. 9, 2012

(65) Prior Publication Data

US 2013/0073244 A1 Mar. 21, 2013

Related U.S. Application Data

(63) Continuation of application No. 10/822,882, filed on Apr. 13, 2004, now Pat. No. 8,332,178.

(51) Int. Cl.
*G01F 19/00* (2006.01)

(52) U.S. Cl.
USPC .......................................... 702/122

(58) Field of Classification Search
USPC .......................................... 702/122
See application file for complete search history.

(56) References Cited

U.S. PATENT DOCUMENTS

| | | | |
|---|---|---|---|
| 4,016,360 A | 4/1977 | Cane | |
| 4,920,263 A | 4/1990 | Fimian et al. | |
| 5,042,265 A | 8/1991 | Baldwin et al. | |
| 5,191,874 A | 3/1993 | McWilliams | |
| 5,197,862 A | 3/1993 | Kladder | |
| 5,388,444 A | 2/1995 | Gerard | |
| 5,495,722 A | 3/1996 | Manson et al. | |
| 5,551,797 A | 9/1996 | Sanford | |
| 5,729,474 A | 3/1998 | Hildebrand et al. | |
| 5,761,649 A | 6/1998 | Hill | |
| 5,836,815 A | 11/1998 | Jennemann | |
| 5,997,476 A | 12/1999 | Brown | |
| 6,088,688 A | 7/2000 | Crooks et al. | |
| 6,167,766 B1 | 1/2001 | Dunn et al. | |

(Continued)

FOREIGN PATENT DOCUMENTS

| EP | 0848215 | 6/1998 |
|---|---|---|
| EP | 1196002 | 4/2002 |

(Continued)

OTHER PUBLICATIONS

Andelman Lelek, Proposal for Commisioninf Services—Ashland High School, Aug. 29, 2003.

(Continued)

*Primary Examiner* — Aditya Bhat
(74) *Attorney, Agent, or Firm* — Seager Tufte & Wickhem LLC.

(57) ABSTRACT

A number of methods for testing an HVAC system for a building structure from a remote location outside of the building structure are disclosed. Generally, the HVAC system has a primarily active component and a primarily dormant component. The method includes the steps of transmitting a test request to the HVAC system from the remote location, performing a test on the primarily dormant component of the HVAC system in response to the test request, and producing a test result. The test result can then be transmitted to a location outside of the building structure.

22 Claims, 12 Drawing Sheets

(56) References Cited

U.S. PATENT DOCUMENTS

| | | |
|---|---|---|
| 6,175,934 B1 | 1/2001 | Hershey et al. |
| 6,282,454 B1 | 8/2001 | Papadopoulos et al. |
| 6,385,510 B1 | 5/2002 | Hoog et al. |
| 6,467,054 B1 | 10/2002 | Lenny |
| 6,493,425 B1 | 12/2002 | Abe |
| 6,496,858 B1 | 12/2002 | Frailong |
| 6,535,838 B2 | 3/2003 | Abraham et al. |
| 6,539,499 B1 | 3/2003 | Stedman et al. |
| 6,557,054 B2 | 4/2003 | Reisman |
| 6,574,672 B1 | 6/2003 | Mitchell et al. |
| 6,584,113 B1 | 6/2003 | Manduley et al. |
| 6,584,430 B1 | 6/2003 | Rosenbaum et al. |
| 6,601,086 B1 | 7/2003 | Howard et al. |
| 6,643,611 B1 | 11/2003 | Ito et al. |
| 6,658,372 B2 | 12/2003 | Abraham et al. |
| 6,658,586 B1 | 12/2003 | Levi |
| 6,697,894 B1 | 2/2004 | Mitchell et al. |
| 6,708,072 B2 | 3/2004 | Arima et al. |
| 6,711,470 B1 | 3/2004 | Hartenstein et al. |
| 6,754,707 B2 | 6/2004 | Richards et al. |
| 6,778,945 B2 | 8/2004 | Chassin et al. |
| 6,782,345 B1 | 8/2004 | Siegel et al. |
| 6,792,321 B2 | 9/2004 | Sepe, Jr. |
| 6,826,512 B2 | 11/2004 | Dara-Abrams et al. |
| 6,832,199 B1 | 12/2004 | Kucek |
| 6,836,737 B2 | 12/2004 | Petite et al. |
| 6,847,916 B1 | 1/2005 | Ying |
| 6,853,958 B1 | 2/2005 | Turin et al. |
| 6,854,010 B1 | 2/2005 | Christian et al. |
| 6,857,013 B2 | 2/2005 | Ramberg et al. |
| 6,891,838 B1 | 5/2005 | Petite et al. |
| 6,892,225 B1 | 5/2005 | Tu et al. |
| 6,947,675 B2 | 9/2005 | Koyama et al. |
| 7,002,462 B2 | 2/2006 | Welch |
| 7,035,768 B2 | 4/2006 | Matsuda |
| 7,058,508 B2 | 6/2006 | Combs et al. |
| 7,092,794 B1 | 8/2006 | Hill et al. |
| 7,130,719 B2 | 10/2006 | Ehlers et al. |
| 7,383,158 B2 | 6/2008 | Krocker et al. |
| 7,734,724 B2 | 6/2010 | Rezvani et al. |
| 8,332,178 B2 | 12/2012 | Simons |
| 2002/0095269 A1 | 7/2002 | Natalini et al. |
| 2002/0147804 A1 | 10/2002 | Cosmao et al. |
| 2002/0147806 A1 | 10/2002 | Hasegawa et al. |
| 2002/0198990 A1 | 12/2002 | Bradfield et al. |
| 2003/0034898 A1 | 2/2003 | Shamoon et al. |
| 2003/0101262 A1 | 5/2003 | Godwin |
| 2004/0232345 A1 | 11/2004 | Jagam et al. |
| 2005/0033707 A1 | 2/2005 | Ehlers et al. |
| 2005/0130652 A1 | 6/2005 | O'Toole et al. |
| 2005/0164678 A1 | 7/2005 | Rezvani et al. |
| 2006/0149414 A1 | 7/2006 | Archacki, Jr. et al. |

FOREIGN PATENT DOCUMENTS

| | | |
|---|---|---|
| EP | 1196003 | 4/2002 |
| JP | 2002044750 | 2/2002 |
| WO | WO 9965192 | 12/1999 |
| WO | WO 0001169 | 1/2000 |

OTHER PUBLICATIONS

Clapman et al., "An SNMP-Based Aprroach for Home Bus Network Management," Proceeds of the International Conference on Consumer Electronics, 4 pages, Jun. 8-10, 1992.

"RTCA's E-Smart Radon Monitoring Service," Radon Testing Corporation of America, 3 pages, prior to Jan. 11, 2006.

REMOTE TESTING OF HVAC SYSTEMS

RELATED APPLICATIONS

This application is a continuation of co-pending U.S. application Ser. No. 10/822,882, filed Apr. 13, 2004, the disclosure of which is incorporated herein by reference in its entirety.

TECHNICAL FIELD

The present invention relates generally to the field of remote testing of heating, ventilating and air conditioning (HVAC) systems.

BACKGROUND

HVAC systems can be controlled by a wide variety of controllers including electromechanical thermostats, microprocessor-based controllers, and/or any other type of controller. In many cases, the HVAC system controller is adapted to control a heater component and/or an air conditioner component (depending on the selected mode), a fan, and in some cases, other components of an HVAC system. Regardless of the particular system, HVAC equipment is typically operated until a failure occurs, then it is repaired.

In many cases, HVAC equipment problems are recognized at the beginning of the heating season (Fall) and/or the cooling season (Spring), and often when the equipment is most needed. As such, HVAC servicing companies often experience an increased demand for their service during these time periods, and HVAC equipment owners are often forced to repair the HVAC equipment at an increased expedited repair cost.

In addition, many HVAC system owners have services contracts that cause the HVAC services provider to visit each HVAC system at least once a year to determine if further service is needed to maintain the HVAC system. Many of these visits are unnecessary, and thus can increase the cost to the HVAC services provider and HVAC system owners.

SUMMARY

Generally, the present invention relates to remote testing of heating, ventilating and air conditioning (HVAC) systems. A number of methods for testing HVAC systems for building structures from a remote location outside of the building structures are contemplated. These methods can allow for efficient checking and, if required, maintenance of a large number of HVAC systems. Further, these methods can provide for remote checking of HVAC systems and allow service contractors to service the HVAC systems that actually need to be maintained.

In one illustrative embodiment of the present invention, an HVAC system includes both a primarily active component and a primarily dormant component. The primary active component may be, for example, the heating component in the winter season, and the primarily dormant component may be the cooling component. Likewise, the primary active component may be the cooling component in the summer season, and the primarily dormant component may be the heating component. In other embodiments, only a heating component or a cooling component is provided, but not both. In any event, one illustrative method includes the steps of transmitting a test request to the HVAC system from the remote location, performing a test on the primarily dormant component of the HVAC system in response to the test request, and producing a test result. The test result can then be transmitted to a location outside of the building structure.

As can be seen, the present invention may be used to remotely test an HVAC system prior to a heating season. The method may include activating the heating component even though the HVAC system would not normally call for heat, and determining if the heating component is in compliance with a number of predetermined parameters or conditions, and reporting the results back to a remote location. This can be performed when just a heating component is provided, or when a heating, a cooling and/or other components are provided. Likewise, the present invention may be used to remotely test an HVAC system prior to a cooling season. The method may include activating the cooling component even though the HVAC system would not normally call for cooling, and determining if the cooling component is in compliance with a number of predetermined parameters or conditions, and reporting the results back to a remote location. Again, this can be performed when just a cooling component is provided, or when a cooling, a heating and/or other components are provided. If the HVAC system includes two or more zones, each zone may be tested in some embodiments.

Further illustrative embodiments for remotely testing HVAC systems include the steps of transmitting one or more test requests from a remote location to a specified group of customer HVAC systems, where the specified group includes a subset of all of the customer HVAC systems in a customer database. The subset may correspond to, for example, those customers that are in a common geographical area, and/or those customers that have the same or similar HVAC system type. The HVAC systems receive the test requests and perform a self-test. In some cases, the rigor of the self-test may depend on the particular test request received. The HVAC system may generate a self-test result, and transmit the self-test result to the remote unit.

These methods can be performed to remotely test a plurality of HVAC systems, each in a different building structure or in a different part of a common building structure, such as in different apartments of an apartment building. These methods can determine which of the plurality of HVAC systems require maintenance, preferably before the individual HVAC system component is required to be in operation by the building owner.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
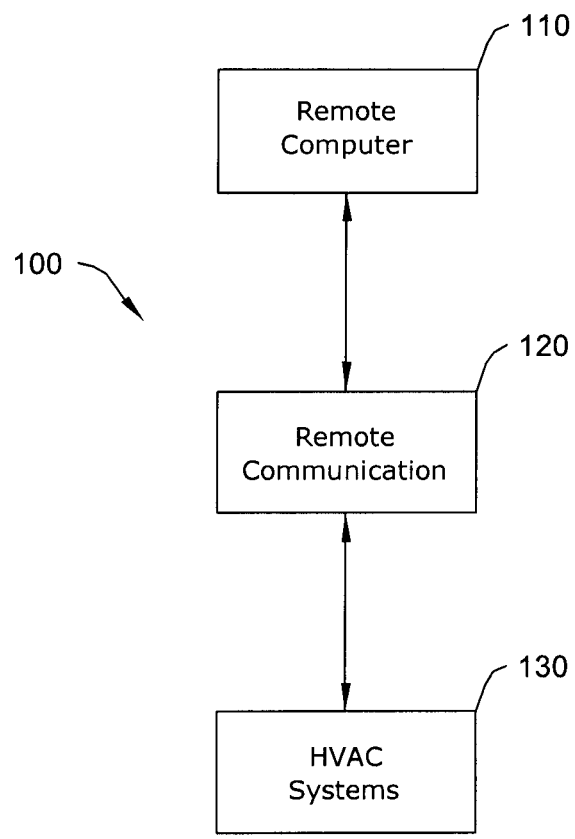
FIG. 1 is a schematic block diagram of a system for performing a method of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention relates to remote testing of HVAC systems, and more specifically, to remote testing of a number of HVAC systems from a remote location. While the present invention is not so limited, an appreciation of various aspects of the invention will be gained through a discussion of the examples provided below.

Referring now to FIG. 1, which shows a schematic block diagram of a system 100 for performing a method of the invention. The system 100 includes a remote computer 110 communicating with an HVAC system 130 via remote communications block 120. The HVAC system 130 can be within a building structure and the remote computer 110 can be outside the building structure at a remote location. In some cases, the remote computer 110 can communicate with a plurality of HVAC systems 130.

In the illustrative embodiment, the HVAC systems 130 can provide test and/or maintenance information back to the remote computer 110 via the remote communications block 120. The remote communications block 120 is used particularly when there is a substantial physical distance between the remote computer 110 and the HVAC systems 130.

The remote computer 110 can include any type of microprocessor capable of operating software useful with the methods described herein. In one illustrative embodiment, the remote computer 110 can include a personal computer having a central processing unit, a display monitor, and communication and connectivity means, such as a modem or internet connection. The remote computer 110 can include any number of additional or other components such as data storage and data routing components, as desired. Alternatively, or in addition, the remote computer 110 may be a web server that, for example, can providing access and/or control via the Internet.

The remote computer 110 may be capable of transmitting one or more signals to one or a plurality of HVAC systems 130 via the remote communications block 120. The remote computer 110 may also be capable of receiving data from the one or plurality of HVAC systems 130 via the remote communications block 120. The remote computer 110 can also be capable of manipulating the received data and generating any number of output reports based on the received data. The remote computer 110 can communicate with the plurality of HVAC systems 130 at the same time or each one sequentially, as desired.

The remote communications block 120 may provide communication between the remote computer 110 and the HVAC system 130. The remote communications block 120 can include and known or future communications technology, including but not limited to, wired communication such as fiber optic, cable, twisted pairs, and the like, or wireless communications such as radio, cellular, satellite, and the like. The remote communications block 120 can be capable of bi-directional communication between the remote computer 110 and the HVAC system 130.

The HVAC systems 130 can include one or more HVAC systems. In an illustrative embodiment, the HVAC system includes 10, 20, 30, 50, 100, 1000, 10,000 or more HVAC systems. The HVAC systems 130 can be residential and/or commercial HVAC systems. In an illustrative embodiment, the HVAC systems 130 can be selected from, for example, a customer database and grouped according to a geographic set of parameters such that all the of selected HVAC systems 130 are located with a specified geographic region. Alternatively, or in addition, the HVAC systems 130 can be selected from, for example, a customer database and grouped according to the type of HVAC system equipment, service level, the order that the HVAC systems are stored in the customer database, or any other suitable way. An illustrative embodiment of one of the HVAC systems 130 is described below.

Figure 2:
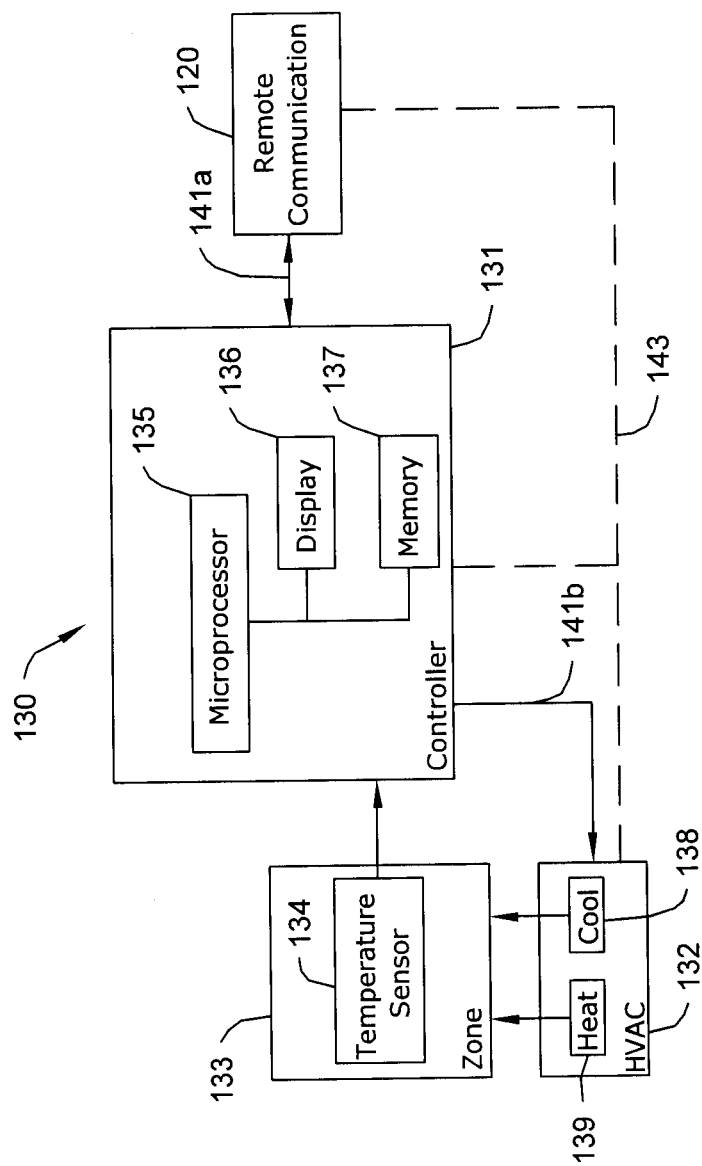
FIG. 2 is a schematic block diagram of an HVAC system.

FIG. 2 is a schematic block diagram of an illustrative HVAC system 130. In this embodiment the HVAC system 130 includes a controller 131, a HVAC unit 132, and at least one interior climate controlled zone 133, where the controller 131 is in communication with the remote communication block 120. In some embodiments, the controller 131 may be coupled to the remote communication block 120 via interface 141a and to the HVAC unit 132 via interface 141b. In other embodiments, however, the controller 131, remote communication block 120 and the HVAC unit 132 may communicate over a common wire or bus, such as bus 143. In some cases, the common wire or bus may be configured to be compatible with the ENVIRACOM® protocol, provided by the assignee of the present invention. The ENVIRACOM® protocol helps HVAC appliances, thermostats, gateways and other components communicate with each other over a common bus.

The controller 131 can be any suitable controller, and in the illustrative embodiment, includes a microprocessor 135, a display 136 and a memory 137. The microprocessor 135 may be capable of being programmed such that the controller 131 changes a control signal sent to the HVAC unit 132 based on the time of day, temperature, humidity, ventilation, or any other desired parameter. The display 136 can provide parameter readings and/or set point information to the user. The memory 137 can be embodied in a variety of forms such as, for example, read only memory can be used to retain operating and/or maintenance programs and predetermined values and random access memory can provide transitory working memory space, as desired. The foregoing elements can be implemented by any suitable devices known in the art.

The illustrative HVAC unit 132 includes a heating component 139 and a cooling component 138. In some cases, however, the HVAC unit 132 may only include a heating component, or only a cooling component, as desired. In the illustrative embodiment, the heating component 139 can include a gas heater and the cooling component 138 can include an air conditioning compressor, and both components may share a common fan.

In the illustrative embodiment, one of the HVAC unit components 138, 139 can be considered the active component and the remaining component may be considered the dormant component. For example, during the heating season (Winter) the heating component 139 may be deemed the active component and the cooling component 138 may be deemed the dormant component. Likewise, during the cooling season (Summer), the cooling component 138 may be deemed the active component and the cooling component 139 may be deemed the dormant component. In an illustrative embodiment, the dormant component is the component not currently energized or was not the last component activated for at least one day, one week, one month, or longer. In like manner, the active component is the component that is either currently energized or was the last component activated. The fluid (e.g., air or water) heated or cooled within the HVAC unit 132 can be provided to one or more respective zones, one of which is represented as zone 133 in FIG. 2.

The interior climate controlled zone 133 can include an environmental parameter sensor such as, for example, a temperature sensor 134 to monitor the effect of the treated fluid used for heating or cooling the air or thermal mass in the zone 133. In the illustrative embodiment, the temperature sensor 134 is in communication with the controller 131.

A self-test, test request and/or maintenance algorithm can be performed on the dormant HVAC component to determine if the dormant HVAC component requires maintenance. The self-test and/or maintenance algorithm can evaluate any useful HVAC parameter such as, for example, heating or cooling capacity of the HVAC system for one or each zone, flame intensity, operating efficiency, and the like.

Figure 3:
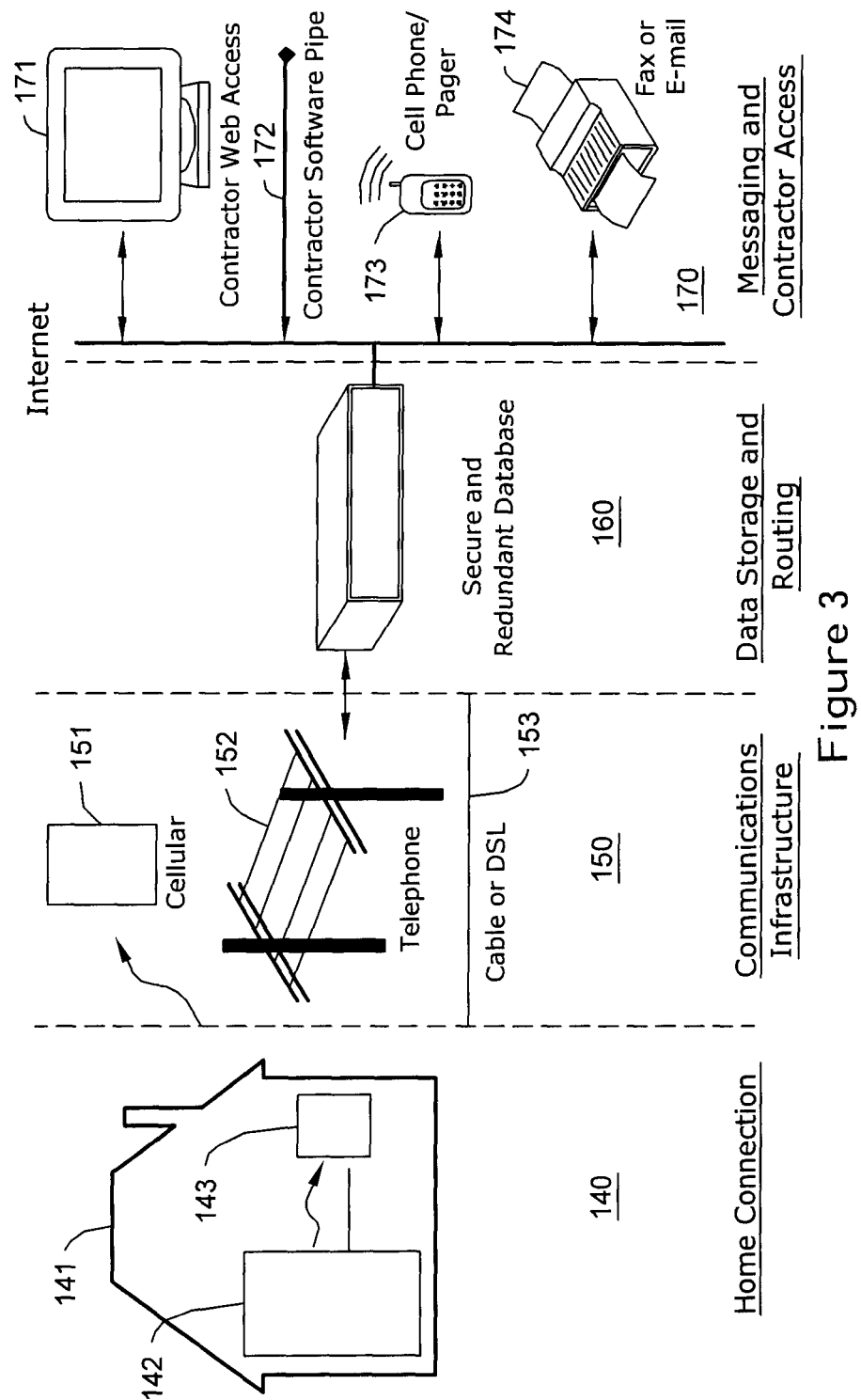
FIG. 3 is a schematic diagram of a system for performing a method of the invention.

FIG. 3 is a schematic diagram of a system for performing a method of the invention. FIG. 3 shows a home or building region 140, a communications infrastructure region 150, a data storage and routing region 160, and a messaging and contractor access region 170. The home or building region 140 includes an HVAC unit 142 operably connected to a controller or gateway 143. The gateway 143 may be provided as a separate gateway unit, part of a thermostat, part of a modem, part of an HVAC controller, or part of any other suitable device, as desired.

The HVAC unit 142 performs climate control for home or building 141. The controller or gateway 143 is in communication with a data storage and routing region 160 via a communications infrastructure region 150. As described above, the communications infrastructure region 150 can include any usable form of communications such as, for example, cellular 151, telephone, cable 153, the internet, and the like. The communications infrastructure region 150 can provide bi-directional communication between the controller or gateway 143 and the remote data storage and routing region 160.

The data storage and routing region 160 is in communication with messaging and contractor access region 170. In one illustrative embodiment, the data storage and routing region 160 can provide a secure and redundant database for the information transmitted to and from the home or building region 140. This data storage and routing region 160 can be accessed by the messaging and contractor access region 170. The term "contractor" is presumed to denote an HVAC maintenance contractor or HVAC maintenance contractor company that can perform maintenance on the HVAC unit 142 located in the remote home or building region 140. However, the term "contractor" may also include other entities such as HVAC manufacturers, OEMs and/or others that may access the messaging and contractor access region 170, if desired.

The messaging and contractor access region 170 provides information to an HVAC contractor regarding the condition of the HVAC unit 142 in the home or building region 140. In one illustrative embodiment, the HVAC contractor can access or receive this information via a contractor web access 171 site, a cell phone, a pager, a PDA 173 and/or a fax or email 174, to list just a few. Software can be operated to work with the information at the data storage and routing region 160 via a contractor software pipe 172. This information can be displayed or accessed via the contractor web access 171, if desired.

In some cases, more than one HVAC contractor can have access and/or run their own software via one or more contractor software pipes 172 to utilize the information stored at the data storage and routing region 160, as described in conjunction with FIG. 6 below. As described above, a plurality of home or building regions 140 can communicate with the data storage and routing region 160 via the communications infrastructure region 150. A test request or maintenance request can be transmitted from the messaging and contractor access region 170 and/or form the data storage and routing region 160 to any number of remote home or building regions 140. Once the home or building region 140 performs the requested test or maintenance routines, results form this routine may be transmitted back to the data storage and routing region 160 for contractor access via the messaging and contractor access region 170. As such, an HVAC contractor can determine which HVAC units 142 need maintenance, and then schedule and perform the required maintenance.

Figure 4:
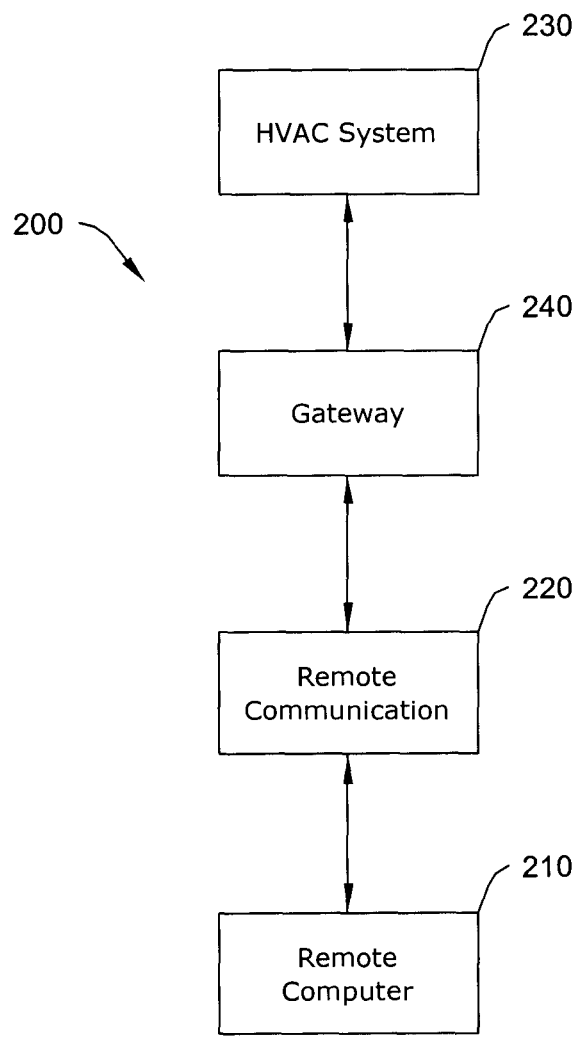
FIG. 4 is a schematic block diagram of another system for performing a method of the invention.

FIG. 4 is a schematic block diagram of another illustrative system 200 in accordance with the present invention. The system 200 can include a remote computer 210 communicating with a HVAC system gateway 240 via remote communications block 220. The HVAC system gateway 240 is connected via a wired or wireless connection to the HVAC system 230. The remote computer 210 can communicate with a plurality of HVAC system gateways 240 in some embodiments. The HVAC system 230 can provide test and/or maintenance information back to the HVAC system gateway 240 and the HVAC system gateway 240 can communicate with the remote computer 210 via the remote communications block 220.

The remote computer 210, remote communications block 220, and HVAC system 230 are described above. The HVAC system gateway 240 can include a microprocessor and memory useful for storing and transmitting test and/or maintenance routines and/or algorithms that are initiated by the test request received from the remote computer 210. The HVAC system gateway 240 can also receive, store and transmit test and/or maintenance results from the HVAC system 230 to the remote computer 210 via the remote communications block 220. The HVAC system gateway 240 can be a commercially available component such as, for example, an ENVIRACOM component commercially available from the assignee of the present invention.

Figure 5:
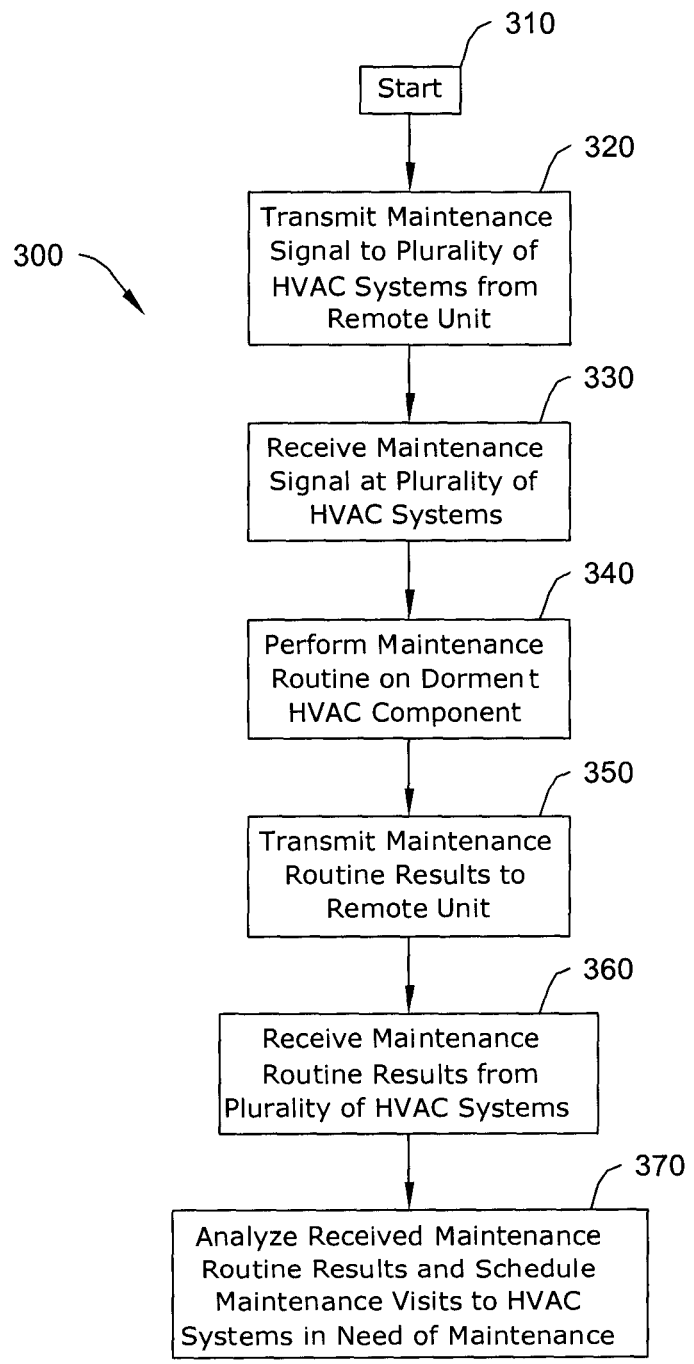
FIG. 5 is a block flow diagram of a method of the invention.

FIG. 5 is a block flow diagram of an illustrative method 300 in accordance with the present invention. The method begins at the start block 310. Block 320 transmits one or more test and/or maintenance signals to one or a plurality of HVAC systems from a remote computer or unit via a communications link. The plurality of HVAC systems can be a specified group of remote HVAC systems chosen based on any number of parameters such as, for example, proximity to a geographic location.

Block 330 receives the test and/or maintenance signal at the plurality of HVAC systems. As described above, the HVAC system can include a gateway where the algorithms or test routine is stored and initiated by the test and/or maintenance request signal.

Block 340 performs a self-test and/or maintenance algorithm on the corresponding HVAC system. In an illustrative embodiment, the self-test and/or maintenance algorithm can be communicated from either the remote computer or from the HVAC gateway. In a further illustrative embodiment, the self-test and/or maintenance algorithm activates a dormant HVAC component and determines the maintenance results.

The step of performing the self-test and/or maintenance algorithm can be executed at any useful time of day or delayed until a specified period of time such as when the home or building is expected to be unoccupied, or at night when the occupants are expected to be sleeping.

Block 350 transmits the self-test and/or maintenance results to the remote unit or computer via the remote communications link. The self-test and/or maintenance results can be transmitted from a microprocessor having memory and communication link as described above. The step of transmitting the self-test and/or maintenance results to the remote unit or computer via the remote communications link can be executed at any useful time of day or delayed for a specific period of time, as desired. Alternatively or in addition, the step of transmitting the self-test and/or maintenance results to the remote unit or computer via the remote communications link can be initiated by a retrieval signal transmitted by the remote computer and received by the HVAC system (or gateway). This retrieval signal can be transmitted by the remote unit and received by the HVAC system (or gateway) at any time following the completion of the self-test and/or maintenance algorithm such as, for example, 12 hours, 1 day, 1 week or 1 month following the completion of the self-test and/or maintenance algorithm, as desired.

Block 360 receives the self-test and/or maintenance results from the plurality of HVAC systems at the remote unit or computer. The remote computer can store the self-test and/or maintenance results in memory, such as in RAM, on a hard disk, on a tape, etc. The remote computer can further generate reports based on the received self-test and/or maintenance results, and provide the results to the contractor, if desired. Block 370 analyzes the received self-test and/or maintenance results, and schedules maintenance on HVAC systems in need of maintenance.

Figure 6:
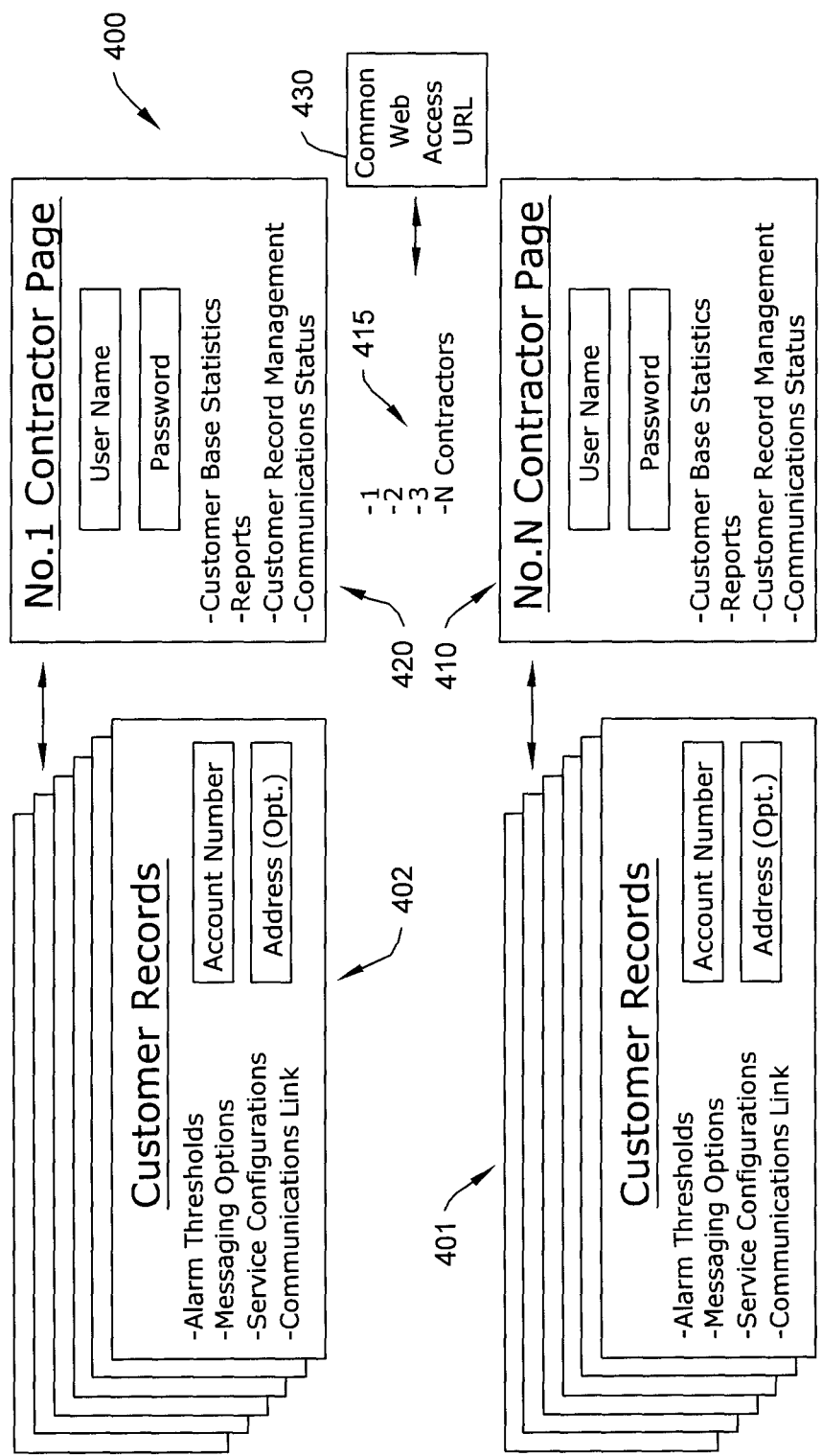
FIG. 6 is a schematic diagram of an embodiment of contractor web access.

FIG. 6 is a schematic diagram of an illustrative embodiment of a contractor web access page 400. The contractor web access page 400 can correspond to the contractor web access icon 171 in FIG. 3. The contractor web access page 400 can be operated by software useful for managing a customer database and utilizing the data storage and routing information described above with reference to FIG. 3.

In an illustrative embodiment, one or more contractors 415 have a contractor page such as, for example, No. 1 Contractor Page 420 and No. "N" Contractor Page 410. Each contractor 415 can access their contractor page via a common web access URL 430 and can enter a user name and password, if desired. Each contractor page 410, 420 can display information regarding its' HVAC maintenance customer base such as, for example, customer base statistics, reports, customer record management, communications status, and the like.

Each contractor page 410, 420 can be linked to a customer base database 401, 402. Each customer base database 401, 402 can include information for each HVAC customer such as, for example, account number, address, alarm thresholds, messaging options, services configurations, communications link, and the like. The information provided in the customer records 401, 402 can be supplied for each customer HVAC unit. The customer base database 401, 402 can be located within the data storage and routing element described in FIG. 3 or the customer base database 401, 402 can be in communication with the data storage and routing element described in FIG. 3. Each contractor 415 can use the data provided to determine which customer HVAC units require maintenance, and then perform the required maintenance.

Figure 7:
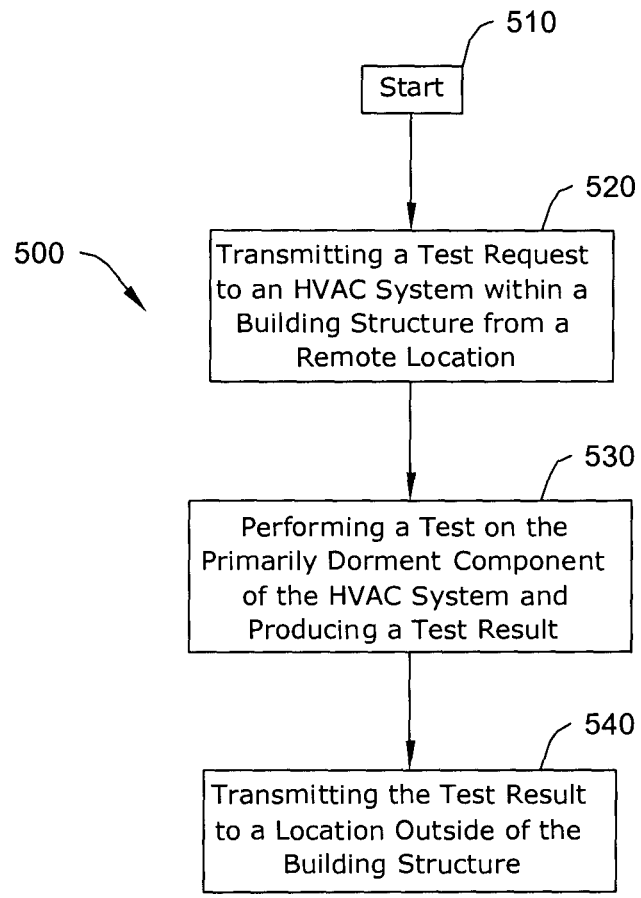
FIGS. 7 to 12 are flow diagrams showing a number of illustrative methods in accordance with the present invention.

FIGS. 7 to 12 are block flow diagrams of illustrative methods of the invention. FIG. 7 is an illustrative method 500 for testing an HVAC system for a building structure from a remote location outside of the building structure, where the HVAC system has a primarily active component and a primarily dormant component. This method begins at the start block 510. The method includes the step of transmitting a test request to the HVAC system from the remote location 520. Then the method includes the step of performing a test on the primarily dormant component of the HVAC system in response to the test request to produce a test result 530. Finally, the method includes the step of transmitting the test result to a location outside of the building structure 540.

In this illustrative embodiment, the primarily active component can be either the heating or cooling component depending on whether it is currently the heating or cooling season, as described above. Likewise, the primarily dormant component can be either the heating or cooling component depending on whether it is the heating or cooling season, as described above. The test request can be transmitted to the HVAC system from a remote computer via a telephone line connection, a wireless connection, a computer network, the internet, or any other suitable connection.

The HVAC system can include a gateway for receiving the test request from the remote computer, and for communicating with the HVAC system. In some embodiments, the gateway can store one or more tests, and can submit at least one of the one or more tests to the HVAC system in response to a test request. In some cases, the gateway can select a subset of the one or more tests and submit the subset of the one or more tests to the HVAC system in response to the test request. The gateway can be within or proximate to the building structure serviced by HVAC system. As described above, the HVAC system can include two or more zones, and the test that is performed can activate the primarily dormant component in conjunction with each of the two or more zones.

It is contemplated that the transmitting step can transmit a test request to two or more HVAC systems from the remote location, as described above. Further, the test result for each HVAC system can be transmitted to a location outside of the building structure. In addition, the remote location that the test request is transmitted from can be the same as or different from the remote location that the test result is transmitted to.

Figure 8:
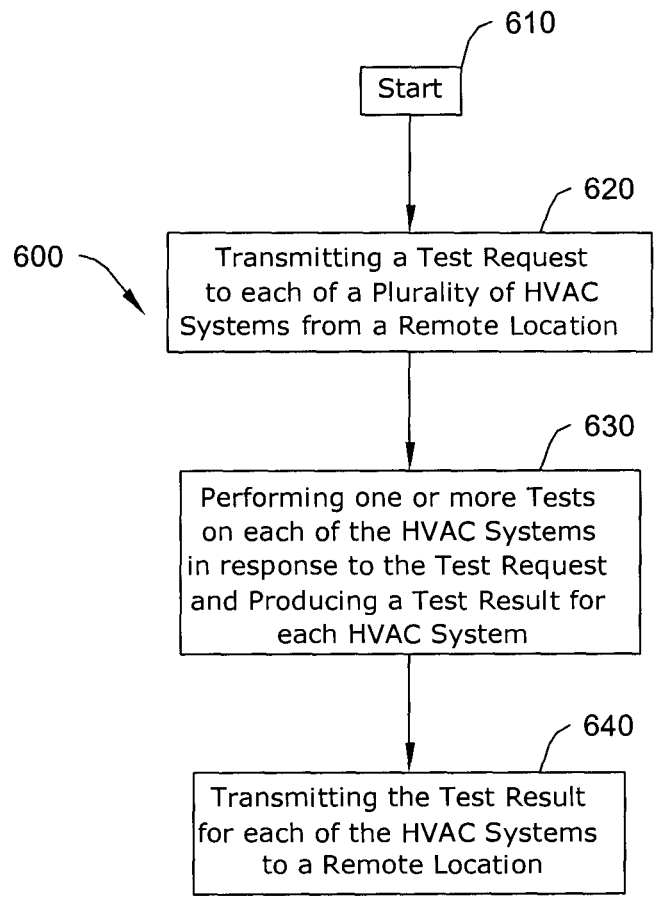

FIG. 8 is another illustrative method 600 for testing a plurality of HVAC systems each in a different building structure from a remote location. This method begins at the start block 610. The method includes the step of transmitting a test request to each of the plurality of HVAC systems from the remote location 620. Next, the method includes the step of performing one or more tests on each of the HVAC systems in response to the test request, and producing a test result for each of the HVAC systems 630. Finally the method includes the step of transmitting the test result for each of the HVAC systems to a remote location 640.

As described above, at least some of the plurality of HVAC systems include a primarily active component and a primarily dormant component, and wherein at least one of the one or more tests that is performed activates and tests the primarily active component of the corresponding HVAC system in response to the test request. Alternatively, or in addition, at least some of the plurality of HVAC systems include a primarily active component and a primarily dormant component, and wherein at least one of the one or more tests that is performed activates and tests the primarily dormant component of the corresponding HVAC system in response to the test request.

Figure 9:
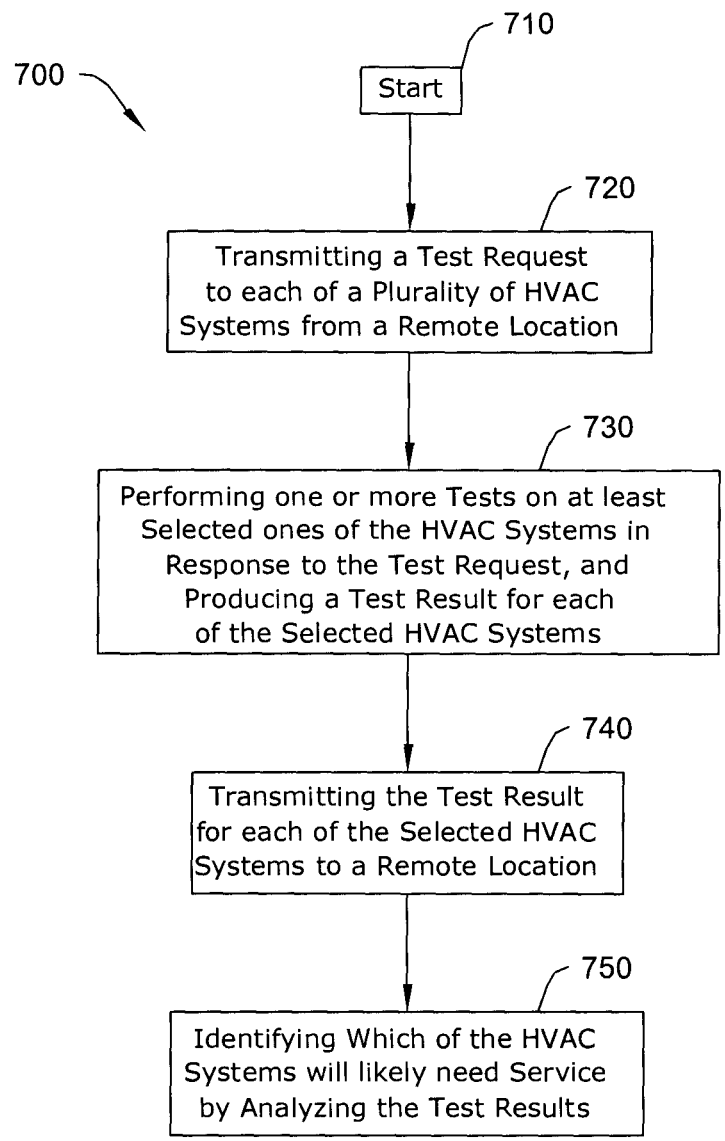

FIG. 9 is yet another illustrative method for determining which of a plurality of HVAC systems will require maintenance 700. This method begins at the start block 710. This method includes the step of transmitting a test request to each of the plurality of HVAC systems from the remote location 720. The next step includes performing one or more tests on at least selected ones of the HVAC systems in response to the test request, and producing a test result for each of the selected HVAC systems 730. Next, the method includes transmitting the test result for each of the selected HVAC systems to a remote location 740. Finally the method includes identifying which of the HVAC systems will likely need service by analyzing the test results 750.

This method can further include the step of providing different test requests to at least two of the plurality of HVAC systems, where each test request identifies a different test to perform. This method can further include the step of charging an owner of an HVAC system an amount that depends on the particular test that is performed on the HVAC system. Finally, this method can further include the step of scheduling service on at least some of the HVAC systems that have been identified as likely needing service.

Figure 10:
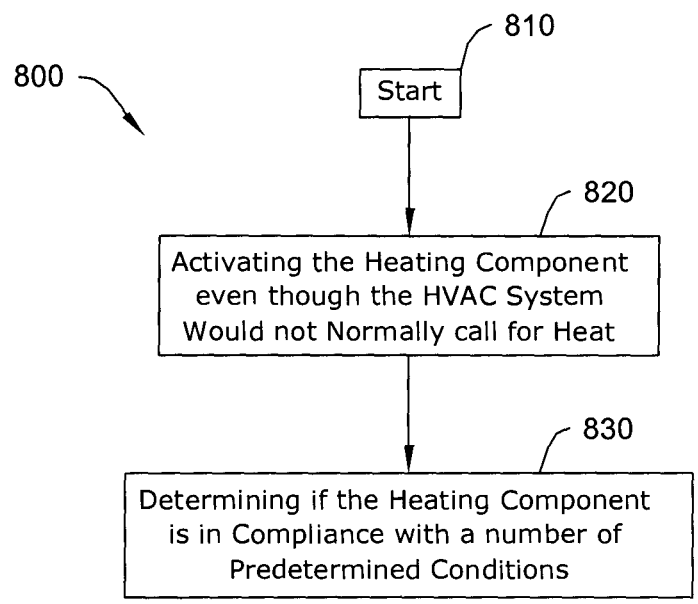

FIG. 10 is another illustrative method for testing an HVAC system for an inside space prior to a heating season, where the HVAC system has a heating component 800. The method starts a block 810. This method includes the steps of activating the heating component even though the HVAC system would not normally call for heat 820. This method further includes the step of determining if the heating component is in compliance with a number of predetermined conditions or parameters 830. The predetermined conditions or parameters can include, for example, flame conditions, heating efficiency, and the like. For example, prior to the heating season (Fall, Winter) or during the cooling season (Summer) a remote self-test can cause the HVAC system (thermostat/controller) to set a temperature parameter in a particular heating zone and activate the heating cycle of the HVAC system. The HVAC system can monitor the HVAC response confirming that the space was heated within a specified time parameter. This sequence can be repeated for all zones within the building. When all zones have been tested, the HVAC system can report the results back to the HVAC contractor, if desired.

Figure 11:
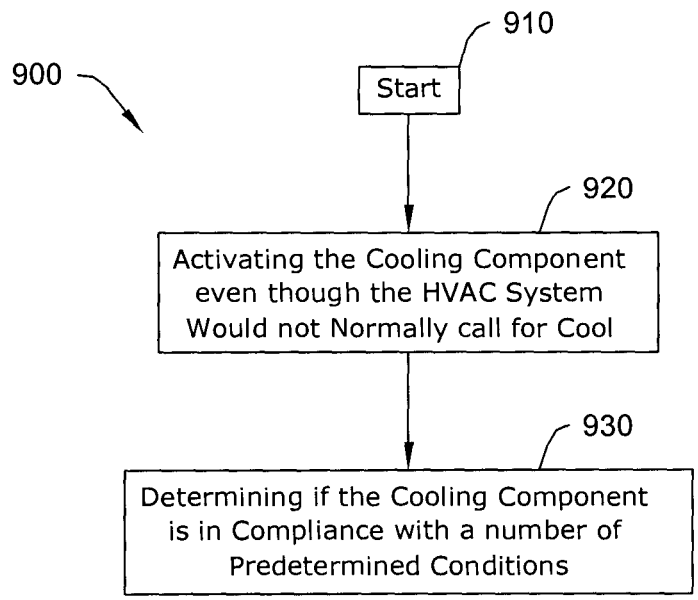

FIG. 11 is yet another illustrative method for testing an HVAC system for an inside space prior to a cooling season, where the HVAC system has a cooling component 900. The method starts at block 910. This method includes the steps of activating the cooling component even though the HVAC system would not normally call for cool 920. This method further includes the step of determining if the cooling component is in compliance with a number of predetermined conditions 930. The predetermined conditions can include, for example, condenser conditions, cooling efficiency, and the like. For example, prior to the cooling season (Spring, Summer) or during the cooling season (Winter) a remote self-test can cause the HVAC system (thermostat/controller) to set a temperature parameter in a particular heating zone and activate the cooling cycle of the HVAC system. The HVAC system can monitor the HVAC response confirming that the space was cooled within a specified time parameter. This sequence can be repeated for all remaining zones within the building. When all zones have been tested, the HVAC system can report the results back to the HVAC contractor, if desired.

Figure 12:
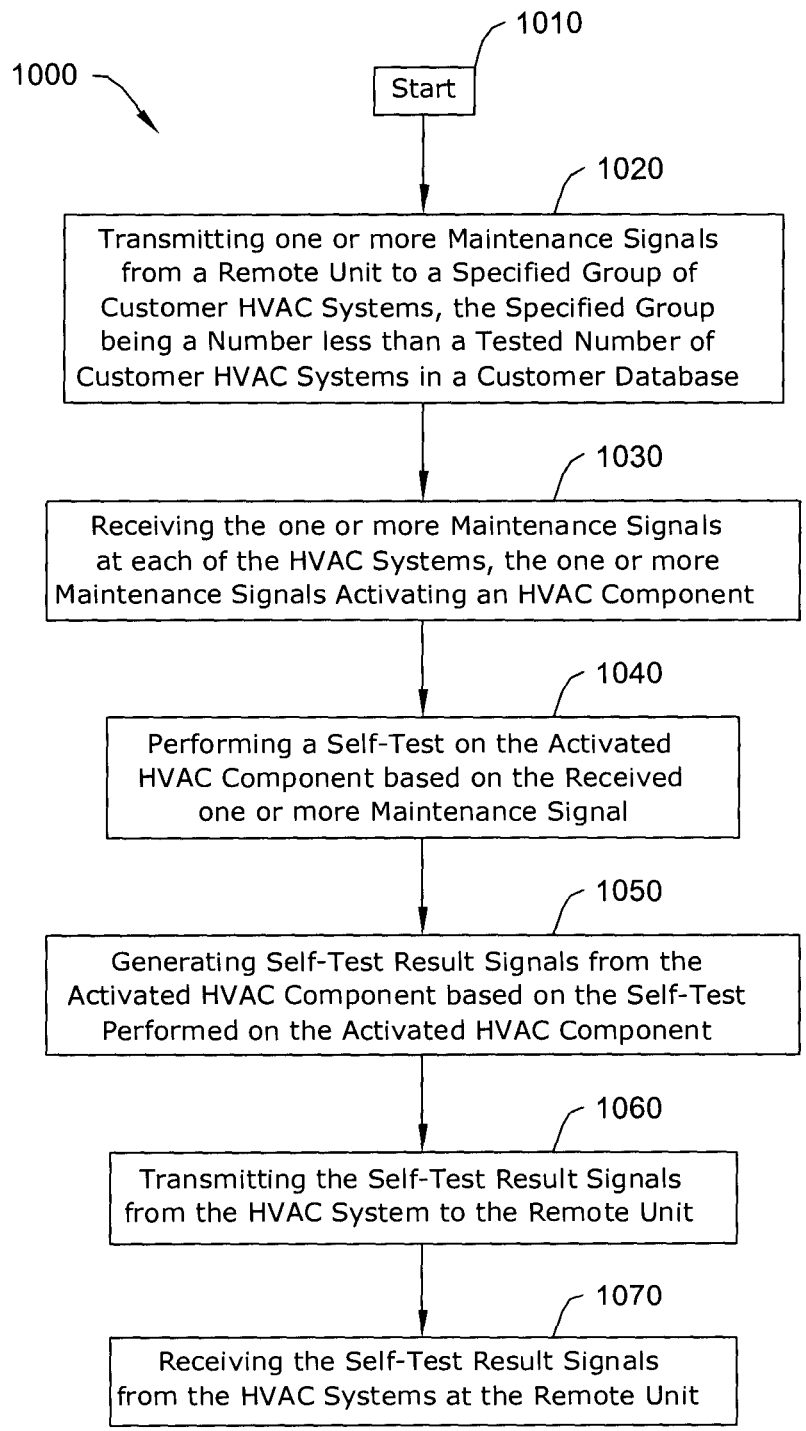

FIG. 12 is another illustrative method of remote testing of HVAC systems 1000. The method starts at block 1010. This method includes the step of transmitting one or more maintenance signals from a remote unit to a specified group of customer HVAC systems, where the specified group is a number less than a total number of customer HVAC systems in a customer database 1020. The next step is receiving the one or more maintenance signals at each of the HVAC systems, where the one or more maintenance signals activates an HVAC component 1030. Next, the method includes performing a self-test on the activated HVAC component based on the received one or more maintenance signal 1040. Then the method includes generating self-test result signals from the activated HVAC component based on the self-test preformed on the activated HVAC component 1050. Then the method includes transmitting the self-test result signals from the HVAC system to the remote unit 1060. Finally, the method includes receiving the self-test result signals from the HVAC systems at the remote unit 1070.

This method can further include the step of determining the specified group of customer HVAC systems based on the specified group of customer HVAC systems being within a specified geographic area prior to the step of transmitting the one or more maintenance signals. This method can further include the step of determining which customer HVAC systems from the specified group of customer HVAC systems likely require maintenance based on the self-test signals received by the remote unit. Finally this method can include the step of performing maintenance on the customer HVAC systems that are determined to likely require maintenance based on the self-test signals received by the remote unit.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A remote device configured to communicate with an HVAC controller, wherein the HVAC controller is for controlling one or more HVAC components of an HVAC system, the remote device comprising:
   a communications port for sending and/or receiving information;
   a memory for storing information; and
   a controller coupled to the communications port and the memory, the controller configured to transmit a request to the HVAC controller via the communications port of the remote device requesting that a test be executed on a dormant component of the HVAC system, the controller is further configured to receive a test result from the HVAC controller via the communications port after the requested test on the dormant component has been executed.

2. The remote device of claim 1, wherein the remote device includes a cellular phone.

3. The remote device of claim 1, wherein the remote device includes a computer.

4. The remote device of claim 1, wherein the remote device includes a web server.

5. The remote device of claim 1, wherein the remote device is configured to communicate with the HVAC controller, at least in part, over the internet.

6. The remote device of claim 1, wherein the remote device is configured to communicate with the HVAC controller, at least in part, over a wireless network.

7. The remote device of claim 1, wherein the controller of the remote device is configured to determine if the dormant component needs maintenance based, at least in part, on the test result received via the communications port.

8. The remote device of claim 7, wherein the controller is further configured to schedule a maintenance visit if it is determined that the dormant component needs maintenance.

9. The remote device of claim 1, wherein the controller is further configured to generate a report based, at least in part, on the test result received via the communications port.

10. A computer readable medium having stored thereon in a non-transitory state software for use by a remote device connectable to a network, the software causing the remote device to execute a method for testing an HVAC system of a building from a remote location outside of the building structure, the HVAC system having an active component and a dormant component, the method comprising:
   transmitting a test request to an HVAC system over a network, the test request requesting the HVAC system perform a test on the dormant component of the HVAC system, wherein the test includes activating the dormant component;
   receiving a test result indicative of one or more HVAC parameters of the dormant component from the HVAC system via the network; and
   determining, based at least in part on the test result, if the dormant component needs maintenance or not.

11. The computer readable medium of claim 10, wherein the remote device includes a cellular phone.

12. The computer readable medium of claim 10, wherein the remote device includes a web server.

13. The computer readable medium of claim 10, wherein the remote device includes a computer.

14. The computer readable medium of claim 10, the method further comprising requesting a maintenance visit if it is determined that the dormant component needs maintenance.

15. The computer readable medium of claim 10, wherein the network includes a wireless network.

16. The computer readable medium of claim 10, wherein the network includes the internet.

17. An HVAC controller for controlling one or more HVAC components of an HVAC system comprising:
   an input/output port for sending and/or receiving information;
   a memory;
   a controller coupled to the input/output port and the memory, the controller configured to perform a self-test on a dormant HVAC component of an HVAC system to produce a test result, the controller further configured to transmit the test result to a remote device for analysis.

18. The HVAC controller of claim 17, wherein the controller is configured to perform the test during a specified period of time.

19. The HVAC controller of claim 17, wherein the controller is configured to perform the test when the building is expected to be unoccupied.

20. The HVAC controller of claim 17, wherein the controller is configured to perform the test when occupants of the building are expected to be sleeping.

21. A method for testing an HVAC system having an active component and a dormant component, the method comprising:
   receiving a test request from a remote device;
   activating the dormant component of the HVAC system in response to the test request;
   producing a test result indicative of a response of the dormant component during the test; and
   transmitting the test result to the remote device for subsequent analysis.

22. The method of claim 21, further comprising scheduling a maintenance visit if during the subsequent analysis, it is determined that the dormant component needs maintenance.

* * * * *